April 24, 1934.   H. J. COOK   1,956,275
CUTTING TOOL
Filed July 9, 1932
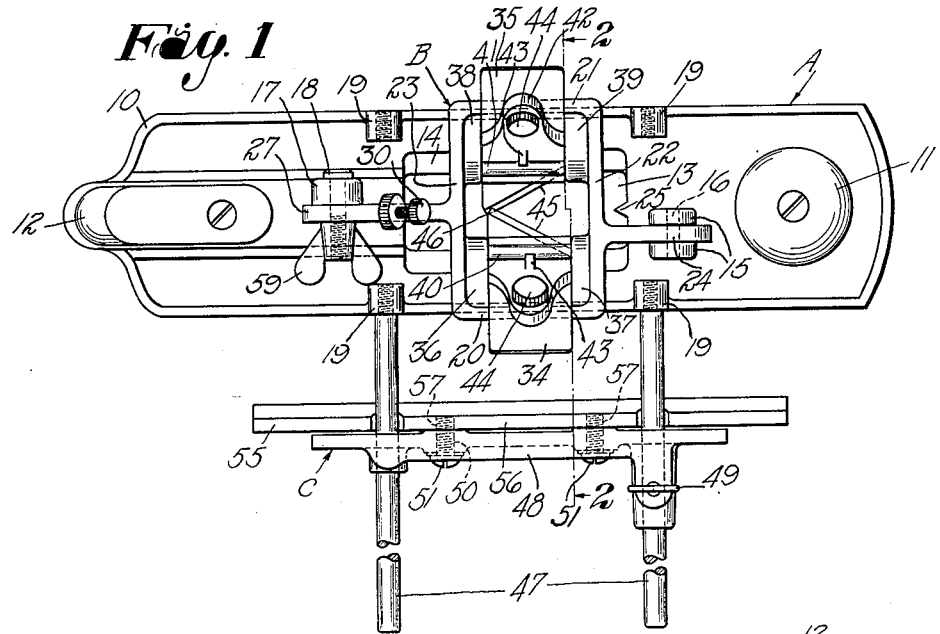
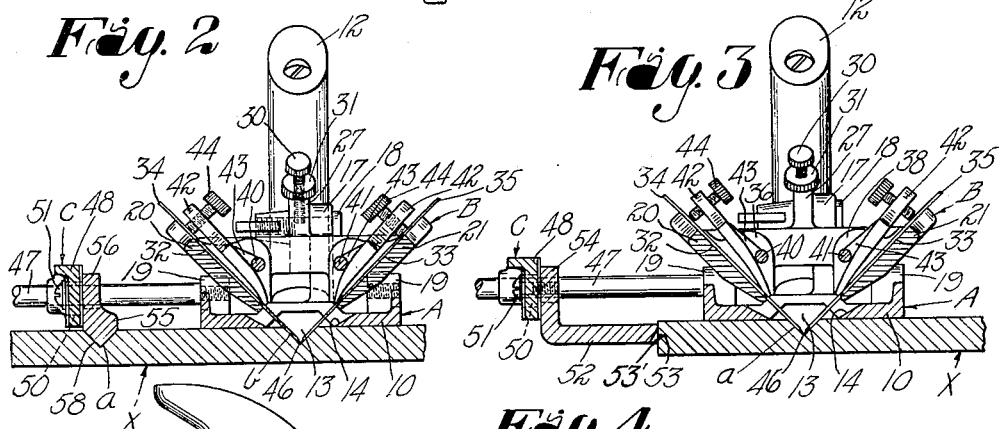
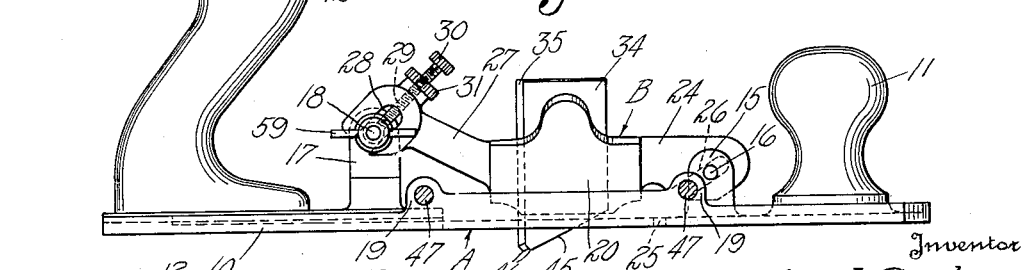
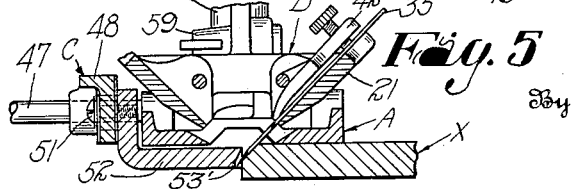
Inventor
Harris J. Cook
By N. Clay Lindsey
Attorney Patented Apr. 24, 1934

1,956,275

UNITED STATES PATENT OFFICE 1,956,275

CUTTING TOOL

Harris J. Cook, New Britain, Conn., assignor to The Stanley Works, New Britain, Conn., a corporation of Connecticut Application July 9, 1932, Serial No. 621,610

9 Claims. (Cl. 145—10)

The present invention relates to an improved tool for use in cutting objects made of fibrous composition, such as composition boards, and while a number of operations may be carried out with said tool, it is peculiarly adapted for use in forming V-shaped grooves in the surfaces of fibrous composition boards.

One aim of the invention is to provide an improved device of this sort having a base adapted to slide over the surface of the work to be operated upon, a tool carrier, and a pair of cutting blades angularly disposed relative to one another so as to cut a V-shaped groove, the carrier being adjustable with the blades as a unit relative to the base for varying the depth of the groove and without disturbing the cutters with respect to the carrier.

Another object of the present invention is to provide an improved device of this character in which the blade carrier is adjustably mounted therein in a novel and advantageous manner.

A further object of the present invention is to provide an improved device of this character which includes an improved means for adjusting the blade carrier and blade means towards and from the work to be cut without changing the angular relation of the cutting edge of the blade means with respect to the upper surface of the work.

A still further object of the present invention is to provide an improved device of this character having a gauge or guide which is adapted to engage in a previously formed groove in the fibrous board to guide the device in forming subsequent grooves in the board.

Still another object of the present invention is to provide an improved device of this character which comprises few parts, is of simple construction and, therefore, is relatively cheap to manufacture and is not apt to get out of order.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown, for illustrative purposes, one embodiment which the present invention may take, Fig. 1 is a top plan view of my improved device showing one form of gauge or guide;

Fig. 2 is a section on line 2—2 of Fig. 1 and showing one form of guide applied to my improved device;

Fig. 3 is a view similar to Fig. 2 but showing another form of guide applied thereto;

Fig. 4 is a side elevation of my improved device; and

Fig. 5 is a view similar to Fig. 3 but showing my improved device in position to bevel the edge of a board.

Referring more particularly to the drawing, A generally designates a base, B a blade carrier, and C a gauge or guiding means of my improved device. The base A comprises a substantially rectangular shaped frame 10 which may be formed from any suitable metal. The frame 10 is provided at its forward end with a knob 11 and at its rear or opposite end with a handle 12 by means of which the tool is manipulated in the cutting operation. Disposed intermediate the sides of the frame and between the knob and handle is a substantially rectangular opening 13, the opposite sides of which slope downwardly and inwardly, as at 14. Between the knob 11 and the adjacent end of the opening 13, the frame 10 is provided with a pair of spaced apart upstanding ears 15 which are disposed to one side of the longitudinal axis of the base A. These ears are provided with alined openings which have rigidly secured therein, as by means of riveting, a pin 16. Between the handle 12 and the adjacent end of the opening 13, the frame is provided with an upstanding arm 17 which is provided near its upper free end with an aperture adapted to have rigidly secured therein a stud 18. This upstanding arm is disposed to the side of the longitudinal axis of the opening 13 opposite to that on which the upstanding ears 15 are positioned. The base A is provided at each side with a pair of internally screw threaded bosses 19.

The base A is adapted to adjustably support the blade carrier B which comprises a substantially rectangular open frame having the sides 20 and 21 and the ends 22 and 23. The sides 20 and 21 slope downwardly and inwardly to conform to the shape of the sides 14 of the opening 13 in the base A above which they are spaced. The ends 22 and 23 of the carrier B are substantially straight. The end 22 has extending forwardly therefrom an arm 24 which is disposed to one side of the longitudinal axis of the carrier B and is in line with the space between the ears 15 of the base A. Since the ears 15 are disposed to one side of the longitudinal axis of the base A, the arm 24 will be disposed to one side of an indicator 25 on the base A to permit the user of the tool to have a clear vision of said indicator. The function of this indicator is to serve as a pointer adapted to be moved along the line on which the article is to be cut during the operation of the tool. The free end of this arm 24 is provided with a recess 26 extending upwardly and forwardly and which is adapted to receive the pin 16 of the base A. The opposite end 23 of the carrier B has extending rearwardly therefrom an arm 27 which is disposed substantially midway of the ends of the end 23. This arm 27 is provided with a recess 28 which extends upwardly and forwardly and which is adapted to receive the stud 18.

The recesses 26 and 28 extend substantially in the same direction. The arm 27 is provided with an internally screw threaded opening 29 which communicates with the inner end of the recess 28 and is adapted to receive a set screw 30 upon which is mounted a lock nut 31.

The sides 20 and 21 of the carrier B are respectively provided on their inner faces with flat surfaces or blade seats 32 and 33 which slope downwardly and inwardly and which are adapted to receive blades 34 and 35 respectively. The surfaces 32 and 33 are substantially the same width as the width of the blades 34 and 35. The flat surface 32 has disposed at opposite sides thereof bosses 36 and 37, and the other surface 33 has disposed at opposite sides thereof bosses 38 and 39. The bosses 36 and 37 are provided with alined openings which are adapted to have rigidly secured therein, as by riveting or the like, a bar 40, while the bosses 38 and 39 are provided with alined openings adapted to have rigidly secured therein, as by riveting or the like, a bar 41. The upper portion of each side 20 and 21 is reduced in width to provide an ear. A clamping member 42 is provided for securing each blade upon its respective seat 32 and 33. Each of these clamping members 42 has a shoulder 43 adapted to engage the respective bars 40 and 41. The upper portion of each clamping member is reduced in width to form an ear which is provided with an internally screw threaded opening which receives a clamping screw 44. It will be noted that the boss 36 is wider than the boss 38, and the boss 37 is of less width than the boss 39 so that a portion of the blade seat 32 extends forwardly of the blade seat 33 and when the blades are secured in operative position the blade 34, secured on the seat 33, will be slightly offset forwardly of the blade 35 carried on the seat 33.

Each of the blades 34 and 35 is provided with a bevelled cutting edge 45 which extends downwardly and rearwardly to terminate in a point 46. When clamped upon their respective seats, the blades are disposed at an angle to one another so that they will cut a V-shaped groove. Since the blades are slightly offset with respect to one another, they may be adjusted so that each will extend through the plane of the other and, therefore, a clean groove will be cut in the work.

The gauge means C comprises a pair of bars 47 having screw threaded ends which are adapted to be selectively received by the bosses 19 at either side of the base A. Slidably mounted on the bars 47 is a gauge supporting member 48 adapted to be held in adjusted position by a set screw 49. The member 48 is provided with a pair of spaced apart elongated slots 50 each of which is adapted to receive a screw 51 by means of which a gauge is secured to the gauge supporting member 48. These screws 51 carry between their heads and the adjacent side of the member 48 washers.

In order to cut the first groove in a board X, a gauge 52 may be secured to the gauge support 48. This gauge 52 comprises a substantially flat piece of metal having a flat edge 53 adapted to engage the edge of the work and a pair of spaced apart upstanding ears 54, only one of which is shown, and each of which is provided with an internally screw threaded opening which is adapted to receive one of the screws 51. For guiding the tool in the cutting of subsequent grooves, a gauge 55 may be secured to the gauge supporting member 48. This gauge 55 comprises an elongated bar having a head 56 provided with a pair of spaced apart internally screw threaded openings 57 which are adapted to be alined with the slots 50 in the member 48 and which are adapted to receive the screws 51. At each side of the head the gauge 55 is provided with semi-circular cutaway portions which are adapted to accommodate the bars 47. The gauge 55 is also provided with a depending V-shaped face 58 which is adapted to be engaged in a groove previously cut in a board X to guide the tool in the cutting of other grooves in the board X. On account of the elongated slots 50 in the gauge supporting member 48, the gauge 55 may be vertically adjusted so that the face of the gauge may accommodate itself to grooves of varying depths.

In the operation of the device, assuming that the blades have been properly secured to the carrier B, the carrier B is then mounted upon the base A so that the recesses 26 and 28 of the respective arms 24 and 27 are received by the pin 16 and the stud 18, respectively. The set screw 30, the inner end of which bears upon the stud 18, is then manipulated so that the carrier B is bodily moved on the pin and stud towards or from the upper surface of the work X. Since the recesses 26 and 28 extend upwardly and forwardly in substantially the same direction, the carrier B will have a sliding movement, rather than a pivotal one, upon the pin 16 and the stud 18 and, hence, the carrier B and the cutting blades will be moved towards and away from the upper surface of the work without changing the angle between the blades and the upper surface of the work. When the carrier B has been adjusted so that the blades will cut a groove of the desired depth, the lock nut 31 is screwed down and a wing nut 59 carried by the stud 18 is tightened up so that the arm 27 will be securely held between the wing nut 59 and the arm 17 of the base A to hold the carrier B in adjusted position. Assuming that a groove $a$ has already been cut in the board X, the gauge 55 will be secured to the gauge supporting member 48. The gauge supporting member 48 is now slid along the bars 47 until the apex of the V-shaped face 58 of the gauge 55 is spaced from the point where the blades overlap a distance equal to that which it is desired to have between the grooves to be cut in the board X. The set screw 49 is now tightened so as to secure the gauge supporting member and gauge against movement on the bars 47. The gauge 55 is now positioned so that its face 58 engages in the groove $a$ and the tool is now drawn across the board X to cut a groove $b$. The tool may now be moved so that the face 58 of the gauge 55 is seated in the groove $b$ and another groove cut in the board X. This operation may be continued until the desired number of grooves have been cut in the board.

On account of the elongated slots 50 in the support 48, the gauge 55 may be vertically adjusted so that the apex of the face 58 of the gauge will be disposed in the same horizontal plane as the points 46 of the blades 34 and 35.

In order to bevel the edge of the board X, one of the blades, for example, blade 34, may be removed. The gauge 52 is substituted for the gauge 55 and is located on the arms 47 so that its edge 53 which contacts the edge of the board X, is disposed under the indicator 25. It will be noted from Figs. 3 and 5 that the edge 53 of the gauge 52 is provided with a cutaway portion 53' which accommodates the lower portion of the blade. The tool is then drawn along the board to bevel the edge thereof.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A tool of the character described comprising a base, a blade carrier mounted on said base, and a pair of cutting blades mounted on said carrier and angularly disposed relative to one another, said carrier and blades being adjustable as a unit relative to the base.

2. A tool of the character described comprising a base, a blade carrier on said base, a pair of opposed cutting blades on said carrier and angularly disposed relative to one another, an arm extending from each end of said carrier and having a recess therein, means mounted upon said base at opposite ends of said carrier and adapted to be respectively received by said recesses, said recesses extending upwardly and forwardly, whereby said arms may slide on said last mentioned means to move said carrier and blades as a unit towards and from the upper surface of the work, and means for maintaining said carrier and blades in adjusted position.

3. A tool of the character described comprising a base, blade cutter means, a carrier for said blade cutter means, an arm extending from each end of said carrier and having a recess therein, a pin mounted on said base at one end of said carrier, a stud mounted on said base at the opposite end of said carrier, said pin and stud adapted to be received by the recesses in the respective arms and adapted to have said arms to slide thereon to move the carrier and blade cutter means as a unit towards and from the upper surface of the work, and means carried by said base and stud to maintain the carrier in adjusted position.

4. A tool of the character described comprising a base, a blade carrier on the base, a pair of cutting blades on the carrier and angularly disposed relative to one another, an arm extending from each end of said carrier and having a recess therein, a pair of spaced apart upstanding ears on said base at one end of said carrier, a pin extending therebetween, an upstanding arm on said base at the opposite end of said carrier, a stud fixedly mounted on said arm, said recesses being adapted to receive therein said pin and stud respectively and extending in substantially the same direction to permit the arms of the carrier to slide upon said pin and stud, whereby said carrier and blades may be bodily moved as a unit towards and from the upper surface of the work without changing the angle between the blade means and the upper surface of the work, and means carried by said stud for clamping one of the arms of said carrier against said arm on the base.

5. A tool of the character described comprising a base, blade cutter means, a carrier for said blade cutter means, an arm extending from each end of said carrier and having a recess therein, means mounted upon said base at opposite ends of said carrier and adapted to be received by said recesses, whereby said arms may slide on said last mentioned means and move said carrier and blade cutter means towards and from the upper surface of the work, means for moving said carrier, and means for maintaining said carrier in adjusted position.

6. In a tool of the character described, a base, a blade carrier, a pair of cutting blades mounted on said carrier and angularly disposed relative to one another so as to cut a V-shaped groove, the cutting edge of each blade extending downwardly and rearwardly to terminate in a point, and a guide mounted on said base and having a V-shaped face adapted to seat in a previously cut groove in the work, the apex of the face of said guide being disposed in the same horizontal plane as the points of the cutting edges of said blades.

7. In a tool of the character described, a base having an opening therein, and blade cutter means mounted on said base and extending downwardly thru said opening in the base, said base having an indicator at one end of said opening to provide a guide point for said blade cutter means.

8. In a tool of the character described, a base having an opening therein, an indicator carried by one end wall of said opening and intermediate the ends of said wall, a blade carrier disposed above said opening, an arm extending from each end of said carrier and adapted to be secured to said base, the arm adjacent said indicator being offset therefrom to permit a clear vision of said indicator, and blade cutter means carried by said blade carrier.

9. A tool of the character described comprising a pair of cutting blades disposed at an angle to one another, a carrier for said blades, and means for simultaneously moving said blades towards and from the upper surface of the work without changing the angle between the blades and the upper surface of the work.

HARRIS J. COOK.